United States Patent [19]

Rayburn

[11] Patent Number: 4,462,062

[45] Date of Patent: Jul. 24, 1984

[54] CAPACITIVE STRUCTURE

[75] Inventor: Charles C. Rayburn, Lynchburg, Va.

[73] Assignee: Illinois Tool Works Inc., Chicago, Ill.

[21] Appl. No.: 475,570

[22] Filed: Mar. 15, 1983

Related U.S. Application Data

[63] Continuation-in-part of Ser. No. 238,717, Feb. 27, 1981, abandoned.

[51] Int. Cl.³ .............................................. H01G 4/08
[52] U.S. Cl. .................................................. 361/323
[58] Field of Search ...................... 29/25, 42; 361/305, 361/306, 311, 318, 323

[56] References Cited

U.S. PATENT DOCUMENTS

| | | | |
|---|---|---|---|
| 2,627,645 | 2/1953 | Harris | 361/311 X |
| 2,930,714 | 3/1960 | Netherwood | 361/323 X |
| 3,094,651 | 6/1963 | Lehner et al. | 361/323 X |
| 3,457,478 | 7/1969 | Lehrer | 361/323 X |
| 3,506,895 | 4/1970 | Kellerman | 361/311 |
| 3,670,378 | 6/1972 | Behn et al. | 29/25.42 |
| 4,041,587 | 8/1977 | Kraus | 29/25.42 |
| 4,097,911 | 6/1978 | Dorrian | 361/305 |
| 4,128,927 | 12/1978 | Dahms et al. | 29/25.42 |
| 4,229,865 | 10/1980 | Fanning . | |

FOREIGN PATENT DOCUMENTS 902755 1/1954 Fed. Rep. of Germany ...... 361/306

Primary Examiner—Donald A. Griffin
Attorney, Agent, or Firm—Donald D. Mondul; T. W. Buckman

[57] ABSTRACT

A capacitive structure, which structure is a length of a plurality of layers, each layer having opposed edges and comprising a dielectric substrate and a metallic film. The metallic film extends from one edge toward the other edge. Each layer includes a zone free of metallic film, which zone is spaced from the other edge and defines a narrow marginal metal film band at the other edge which is spaced from the remainder of the metallic film by the metal free zones. The layers are disposed with the metallic film of each layer being separated by dielectric material from the metallic film of the adjacent layer; the layers are offset such that first edges of a first group of layers lie outwardly beyond second edges of a second group of layers at one side of the structure, and first edges of the second group of layers lie outwardly beyond the second edge of the first group of layers at the other side of the structure, the layers of the first group alternating with the layers of the second group. The layers of each group are coated with electrically conductive material to electrically connect the metallic film of each layer of each respective group.

11 Claims, 8 Drawing Figures

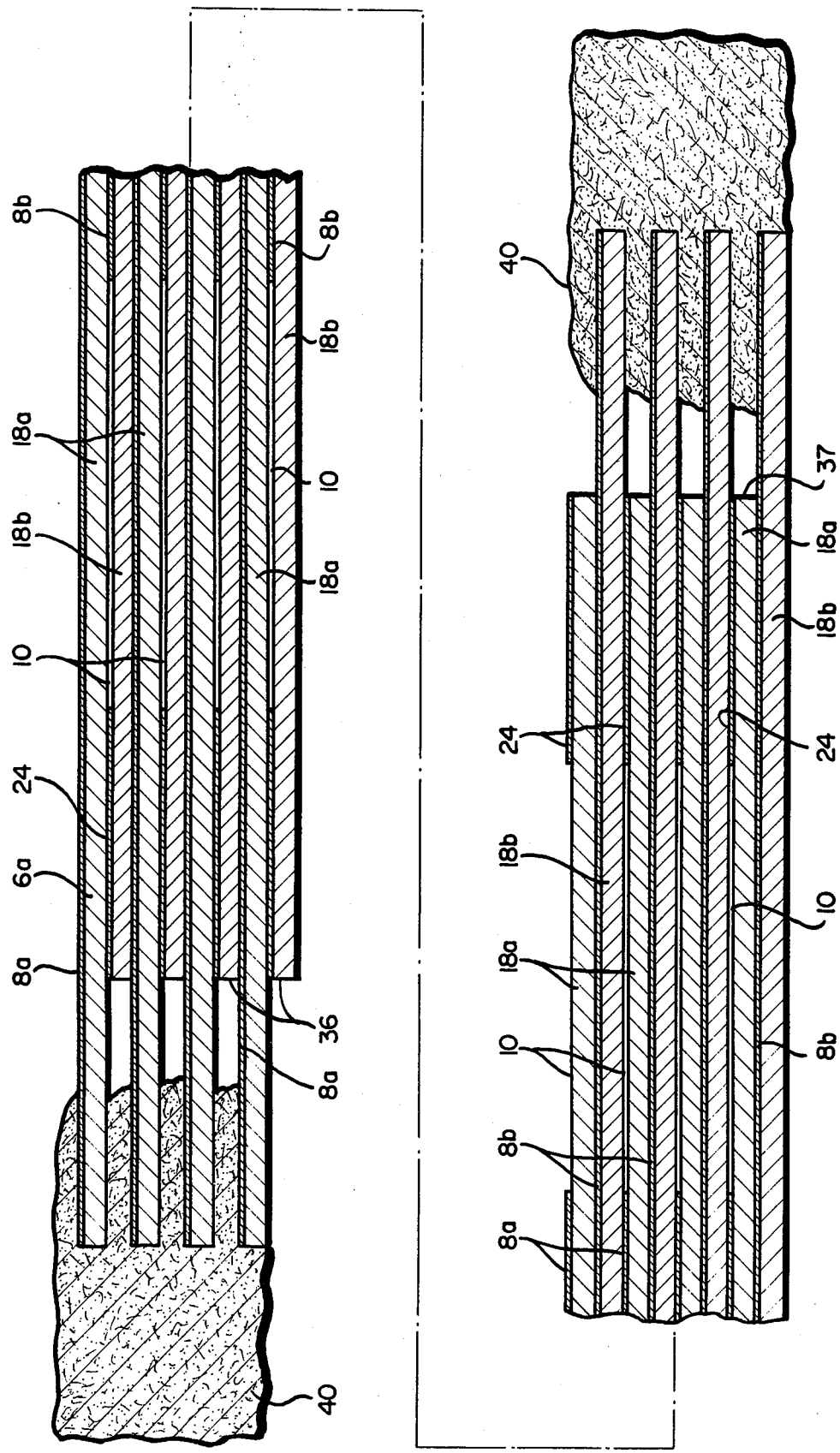

4,462,062

CAPACITIVE STRUCTURE

BACKGROUND OF THE INVENTION

This application is a continuation-in-part of U.S. patent application Ser. No. 238,717, filed Feb. 27, 1981 and now abandoned.

This invention relates to layer or stack wound capacitors and to methods and apparatus for making of the same.

One such method and apparatus is shown and described in U.S. Pat. No. 3,670,378. In that patent the process for the production of the capacitors comprises first forming capacitor bodies by winding alternate metallic and dielectric films on a drum, contemporaneously winding separating layers between the capacitor bodies to form a parent winding having alternate layers of capacitor bodies and separating layers, then applying a metallic spray coating to the edges of the parent winding to connect metallic films, and thereafter severing the parent winding perpendicular to the separating layers to form the individual capacitor bodies. These resultant capacitor bodies have interwoven metallic layers which are separated by dielectric layers. The layers of one group comprising dielectric substrates and metallic films project outwardly from one side of the capacitor body while another group of substrates and films project from the other side of the capacitor body. The metallic coating is applied such that it connects electrically together the metallic films on the outwardly projected group of layers. Thus, there are provided two electrodes or sets of capacitor "plates" which are dielectrically isolated from one another but which are interwoven.

In the foregoing arrangement it sometimes happens that during the winding process the being-wound layers will weave or depart from their intended paths resulting in one or more layers being improperly located with respect to the adjacent layers. If the separation between the groups of layers is not sufficient, the capacitor may be short-circuited or it may have a lower than intended dielectric strength at one or more regions. If the separation is excessive the resulting capacitance of the capacitor is reduced.

Moreover, although the foregoing arrangement provides economical manufacture of capacitors as compared with certain other manufacturing approaches, such as wound capacitors, there is nevertheless a demand for further economies in capacitor manufacture. This demand for further economies in capacitor manufacture is all the more immediate in view of the economic realities of the present-day capacitor marketplace where such devices have almost come to be regarded as commodities so that price is often the single basis upon which buying decisions are predicated. With such pressures existing with respect to selling price, the need to reduce cost of manufacture without degrading product quality is particularly strong.

OBJECTS AND SUMMARY OF THE INVENTION

An object of this invention is to provide a high quality commercial capacitor of the general type stated, but which is different in structure and wherein the manufacturing process is considerably lower in cost.

A further object of this invention is to provide an arrangement of the type stated which materially reduces the possibility of short-circuiting of the being-wound capacitor as a result of improper disposition of the metallic dielectric films.

Another object of this invention is to provide an arrangement of the type stated in which the production of capacitors is much faster than is possible with presently available equipment.

Another object of this invention is to provide apparatus of the type stated which functions to apply the layers forming the capacitor to a drum or transfer wheel directly from laminating or lay-on rollers. Such an arrangement prevents the supply material from traveling unsupported in space, thereby reducing weave and consequent misalignment of the capacitor layers.

A further object of this invention is to provide an intermediate length of capacitive structure which is sufficiently rugged to withstand the rigors of shipping to remote locations for further processing into individual capacitors.

In accordance with the foregoing objects the capacitor of the present invention comprises a plurality of layers having opposed edges, each layer comprising a dielectric substrate and a metallic film, the metallic film extending from one edge toward the other edge, each layer including a zone free of said metallic film, said zone being adjacent to but spaced from said other edge to leave a narrow marginal film band at said other edge which is spaced by said zone from the remainder of said metallic film, said layers being disposed with the metal film of one layer being separated by dielectric material from the metal film of the adjacent layer, said layers being offset such that at one side of the capacitor said edges of a first group of layers lie outwardly beyond said other edges of a second group of layers, and at an opposite side of the capacitor said edges of the second group of layers lie outwardly beyond said other edges of the first group of layers, the layers in the first group alternating with the layers of the second group and the outwardly lying edges in each group being coated with electrically conductive material to connect electrically the metal film layers of each group, said narrow marginal metallic film band thereby separating the adjacent coating material from the metal-free zone.

The method of this invention comprises providing first and second webs of material each having a dielectric substrate, a metallic film coating, and narrow parallel longitudinal metal-free zones; slitting said webs along parallel lines that are offset from said metal-free zones to form ribbons, each of which has a narrow marginal metal film band extending inwardly from a longitudinal edge of the ribbon to said metal-free zone, winding said ribbons from said first and second webs alternately on a drum and in said winding offsetting the ribbons of one web from the ribbons of the other web to form a plurality of adjacent interleaved rings of capacitance structure each having alternately disposed metal and dielectric layers and with there being in each structure the layers of the ribbons of each web respectively projecting laterally outwardly from said marginal metal film band of the ribbons of the other web, coating the laterally projected parts of each structure with a metal substance to connect electrically the metal films of the respective webs of the structure, and severing the structure transversely of the ribbons to form capacitive ropes. The method of this invention further comprises subjecting said capacitive ropes to pressure and heat to create substantially rigid, capacitive sticks and then separating said capacitive sticks into individual capacitors.

The apparatus of this invention comprises first and second supply rolls of webs, each web having a dielectric substrate with a metallic film coating, a rotatable drum spaced from said supply rolls, first and second laminator rollers, said rollers being circumferentially spaced with respect to the periphery of said drum, a tension sensing roller associated with each laminator roller and in spaced parallel relation thereto to constitute with its associated laminator roller a roller pair, one web being strained and tensioned over each roller pair, and means for slitting the web into ribbons prior to winding said ribbons on said drum to provide alternate layers of metallic and dielectric material, said laminating rollers being sufficiently close to said drum and said slitting means being sufficiently close to said laminating rollers such that the ribbons are supported over substantially their full length prior to winding onto said drum. Said roller pairs are offset from one another such that, in winding said ribbons upon said drum, there are formed upon said drum a plurality of adjacent interleaved rings of capacitance each having alternately disposed metal and dielectric layers and with there being in each structure the layers of the ribbons of each web respectively projecting laterally outwardly from the edges of the ribbons of the other web.

The invention may also include the application to one of the webs of a thin film of adhesive in at least a portion of the electric field regions of a capacitor, but the adhesive is not applied in the region of slitting of the web or in the laterally projected parts of the structure where a spray contact is made with the metallic coating. The purpose of the adhesive is, to the extent needed, to lock the lamination so that the wound capacitor structure can be handled without delamination.

The invention may also include the application of heat to the ribbons as they are wound upon the drum. Such application of heat should be sufficiently frequent and sufficiently warm to tack adjacent layers of ribbons together as they are wound upon the drum so that the lamination is locked and the wound capacitor structure can be handled without delamination.

In another aspect of the invention the webs can be passed through a station where a number of laser beams can burn off the metal to form precisely spaced demetalized zones. These demetalized zones may be made much narrower by laser beam burn-off than would be obtainable by material commercially available with conventional demetalized zones, which are much wider than is necessary for capacitors with low voltage ratings.

BRIEF DESCRIPTION OF THE FIGURES

FIG. 6 is a much enlarged fragmentary sectional view of parts of the capacitor according to the invention;

DETAILED DESCRIPTION

Figure 1:
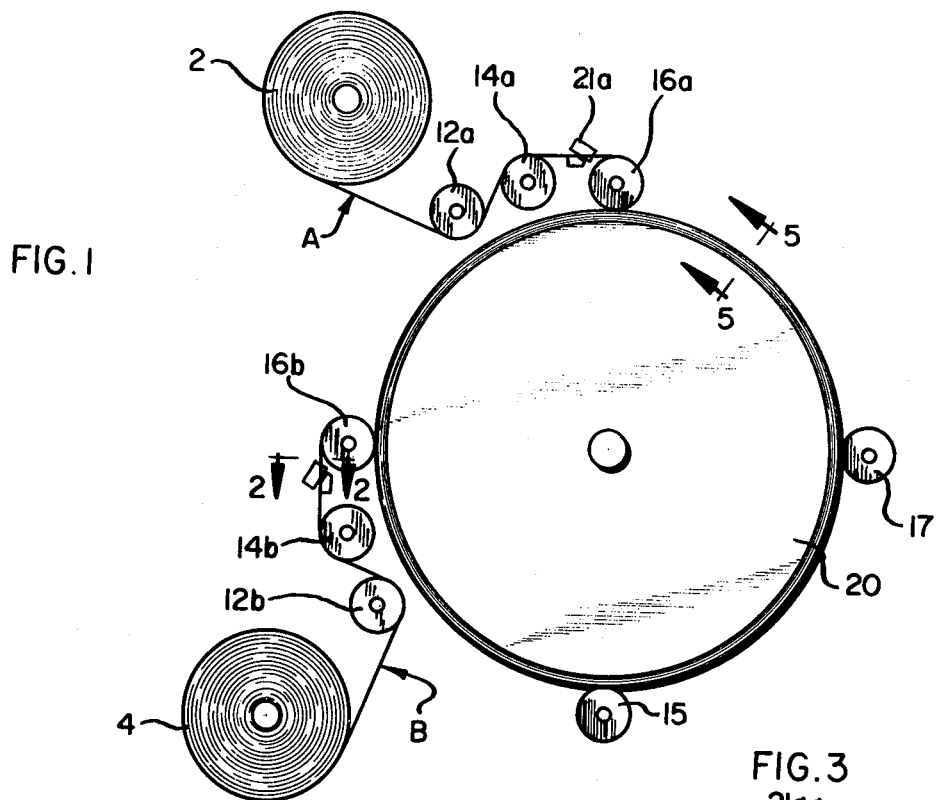
FIG. 1 is a diagrammatic view of apparatus constructed in accordance with and for carrying out the method of the present invention.
Figure 3:
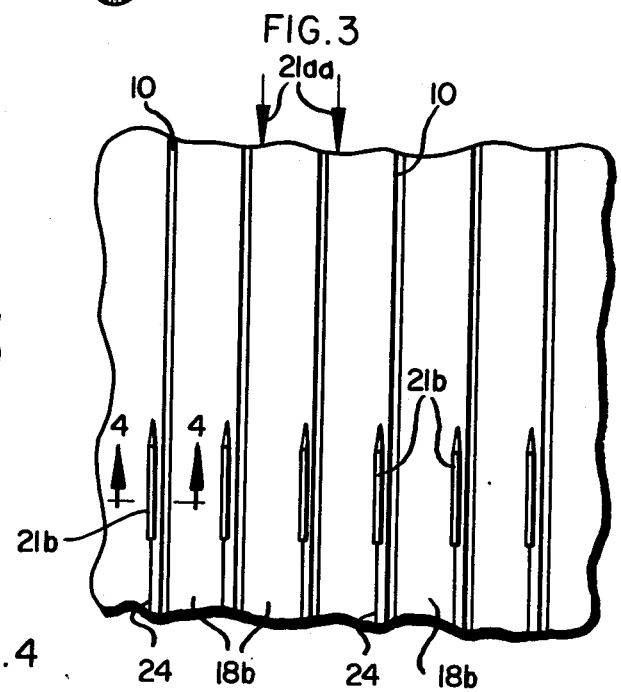
FIG. 3 is a fragmentary top-plan view on an enlarged scale, of the structure of FIG. 2.
Figure 4:
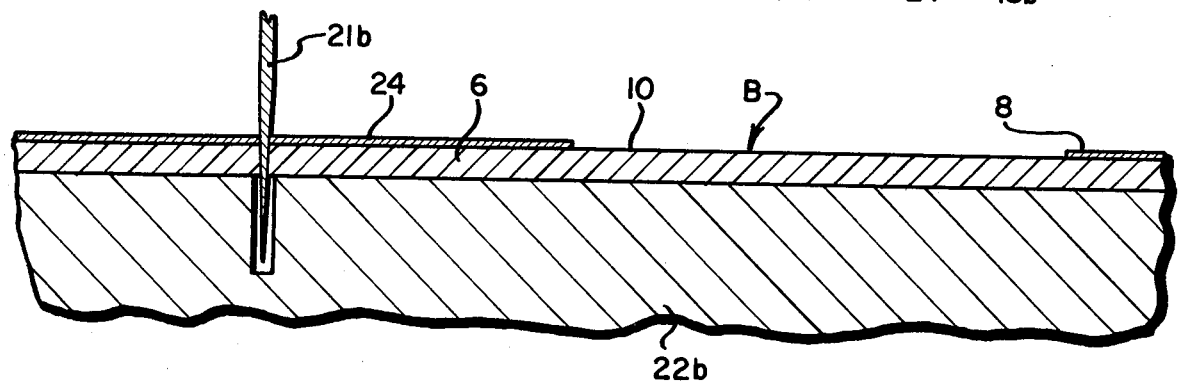
FIG. 4 is an enlarged fragmentary sectional view taken along line 4—4 of FIG. 3.

Referring now in more detail to the drawing FIG. 1 there is shown a pair of supply rolls 2, 4 from which webs A and B are withdrawn. Each of the webs A, B comprises a dielectric substrate 6 and a metallic film 8. The substrate 6 may be of a suitable plastic such as the resin sold under the trademark "Mylar". The film 8 may be a vapor deposited aluminum, and both the substrate 6 and metallic film 8 are exceedingly thin. By way of example but not of limitation, the substrate 6 may be of the order of 0.001 inches or less in thickness while the thickness of the metalized film 8 may be of the order of 500 angstrom units. Each web A, B has a plurality of parallel demetalized or metal-free zones 10, as best seen in FIGS. 3 and 4 with respect to the web B. It is understod, however, that a like series of demetalized zones are provided on the web A. The webs A, B may have the demetalized zones 10 preformed thereon, or they may be formed by a laser burn-off method as will later be described. In any case the webs pass over a series of rollers respectively for slitting into ribbons and interleaved alternate winding onto a large diameter drum or transfer wheel 20.

In particular, the web A passes over an idler roll 12a, the axis of rotation of which is shiftable to control weave of the web A. The idler roll 12a moves in and out as a unit with the supply roll 2 under the control of a conventional edge guide sensor (not shown) to control the weave. From the idler roll 12a, the web passes by the aforementioned edge guide sensor to a tension sensing idler 14a. The tension sensing idler sends a signal to a variable drag clutch (not shown) on which supply roll 2 is mounted. This closed loop control maintains the tension at any preset value. The apparatus also includes a laminating or lay-on roller 16a. Between the rollers 14a, 16a is a web-slitting station at which the web A is slit into a plurality of ribbons prior to passage around the lay-on roller 16a and wrapping onto the drum or transfer wheel 20. Similarly, the web B passes over a shifting idler 12b and from there to a tension sensing idler 14b past the slitting station onto the laminating or lay-on roller 16b, where the idler 12b responds to a second edge guide sensor (not shown) to control the weave of web B while the tension sensing idler 14b again sense a signal to a variable drag clutch (not shown) on which the supply roll 4 is mounted to maintain the tension at a preset value.

The slitting station for the web B comprises a plurality of spaced parallel cutters such as razor blades 21b which cooperate with a polished web support bar 22b over which the web B passes. Likewise, for the web A the slitting comprises spaced parallel razor blades 21a (FIG. 7) which cooperate with web support bar 22a. For each web the slitting station forms a plurality of ribbons which immediately pass onto the rollers 16a or 16b, as the case may be, and then onto the drum 20. The result is that the ribbons are supported substantially throughout their full lengths prior to winding onto drum 20. Because the ribbons do not travel unsupported in space, weave is eliminated and the ribbons can be accurately deposited onto the drum 20. This is in contrast to prior art arrangements which rely upon edge guides, sometimes unsatisfactorily, to prevent weave of the web.

The laminating or lay-on rollers press against the drum or transfer wheel 20 and the razor blades may operate directly in narrow slits on the rollers 16a, 16b. In any event, the arrangement for slitting the webs provides smooth cuts by the razor blades without causing the web material to wrinkle. This is particularly important as it is difficult to obtain smooth cuts without wrinkling in web material as thin as that being utilized in the present invention. In the present apparatus, the rollers 16a, 16b may be located either 90 degrees apart as shown in FIG. 1, or 180 degrees apart.

Figure 2:
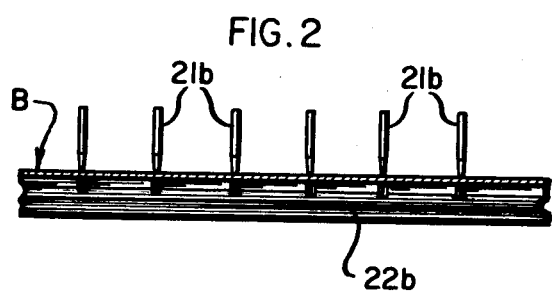
FIG. 2 is a fragmentary sectional view taken along line 2—2 of FIG. 1.

The web B is slit into the plurality of ribbons 18b, as seen in FIGS. 2-4. The web A is also slit to provide ribbons 18a which, like the ribbons 18b, ultimately will become capacitor layers, as seen in FIG. 6. The slit lines for the web B are offset from the demetalized zones 10 so as to form marginal metal film bands 24 at one edge of each ribbon 18b. A like slitting takes place for the web A except, however, at the slit line for each blade 21a is offset from that as compared to FIG. 3 to form like marginal film bands 214 on the ribbons 18a. Thus, if the blade 21b is located to the left of the demetalized zone 10 in cutting the web B (reference to FIG. 3) then for the web A the blade 21a will be to the right of the adjacent demetalized zone, as indicated by arrows 21aa in FIG. 3.

Figure 5:
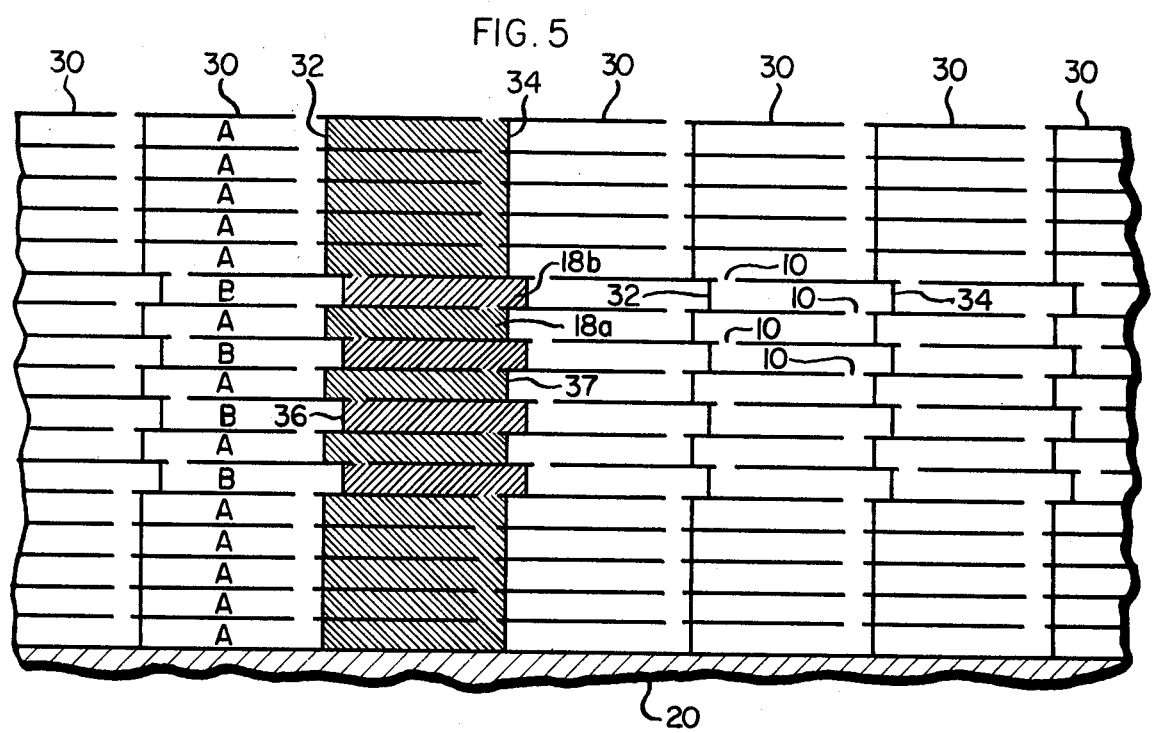
FIG. 5 is an enlarged diagrammatic view partially in section taken along line 5—5 of FIG. 1.

The ribbons are disposed simultaneously upon the drum 20 to produce the layered pattern shown in FIG. 5. There are formed a plurality of hoops or rings 30 of capacitor structure from which individual capacitors may be formed. In FIG. 5 only one of the rings 30 is shown in cross-section for purposes of clarity of illustration. Moreover, the sources of the various ribbons, namely from the supply web A or B, is indicated on one of the structures 30 in FIG. 5. It will also be apparent that the ribbons are not illustrated to scale, but rather are considerably foreshortened. In any case, there is an initial winding of A layers adjacent to the drum 20, as shown by the lower five such layers designated in FIG. 5. Thereafter, the ribbons are interleaved and offset from each other as they are simultaneously wound onto the drum 20 to form the pattern indicated by the A and B alternate layers in FIG. 5. Thereafter, another group of A layers are wound over the group of A and B alternate layers. The inner and outer A layers serve as reinforcement while the interweaved A and B layers or ribbons provide the active portion of the capacitor structure.

Each of the separate rings 30 may be removed from the drum 20 and the sides 32, 34 thereof coated in a conventional manner with a metallic spray coating 40 (FIG. 6). The ring 30 may then be cut perpendicular to the edges 32, 34 to form a length of capacitor structure. The thus-formed length of capacitor structure is then subjected to pressure and heat to create a substantially rigid capacitive stick. That capacitive stick can then be cut transversely to form individual capacitor units.

FIG. 6 shows an enlarged sectional view through several inter-leaved layers of the capacitor. It will be seen that at one side of the capacitor metalized films 8a and the substrate 6a project laterally outwardly of the adjacent edges 36 of the layers 18b. The metalized spray coating 40 electrically connects the metalized films 8a to form a set of capacitor electrodes or plates, this being made possible by the space between the layers or ribbons 18a. The space between the left-hand metallic coating 40 of the top portion of FIG. 6 and the metalized layer 8b of the ribbon 18b is at least the width of the metalized zone 10 plus the width of the marginal metal film band 24. Thus, in effect, the band 24 is a "floating" electrode. By providing for the floating electrode formed by the band 24 the full width of the demetalized zone 10 is utilized for dielectric separation along the surfaces of the layers, thereby reducing the possibility of short-circuiting or changing the capacitance of the capacitor from its prescribed value.

On the other side of the capacitor, as shown by the lower portion of FIG. 6, the layers 18b project outwardly from the margin 37 of the layers 18a for receiving the right-hand metal spray coating 40, shown in the bottom portion of FIG. 6. The marginal metal film band 24 in the lower portion of FIGS. 6 and located on the layer 18a likewise serves as a "floating" electrode so that full advantage is taken of the demetalized zones 10, as previously described.

Figure 7:
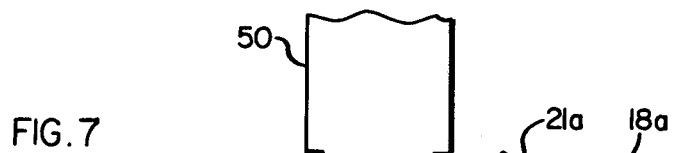
FIG. 7 is an enlarged fragmentary portion of FIG. 2 and showing structure for applying adhesive to the web.

In a modified form of the invention shown in FIG. 7 any suitable thin adhesive may be deposited on the web A by an applicator 50 positioned just before the slitting operation occurs. Epoxy resin is one type of adhesive that may be used, but the invention is not limited thereto. The adhesive is not applied in the region of slitting or in the extension areas of the web where the metallic spray is to be applied. The purpose of the adhesive, if needed, is to lock the lamination together after being wound onto the drum 20 so that the structure 30 can be handled without delamination. The adhesive can be deposited and spread in a film thickness substantially less than one micron, and the adhesive may thus be used without materially reducing an efficient capacitance-to-volume ratio. An alternative or complementary approach to such locking of the lamination is by the application of heat to the ribbons as they are wound upon the drum. It is contemplated by this invention that such application of heat would be sufficiently frequent and sufficiently warm to tack adjacent layers of ribbons together as they are wound upon the drum.

Figure 8:
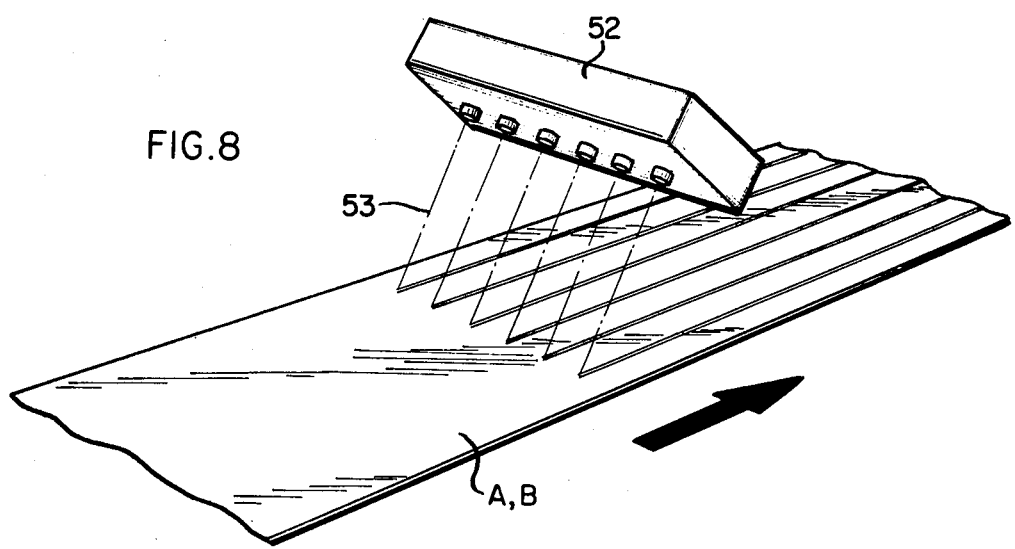
FIG. 8 is a diagrammatic showing of the laser burn-off station which forms the demetalized zones as the web is withdrawn from its supply roll.

The web material used in the present invention may be purchased with the demetalized zones. However, these demetalized zones are usually somewhat larger than is necessary for low voltage capacitors. Accordingly, as shown in FIG. 8, it is possible to form the demetalized zones 10 as the web A or B is being withdrawn from the supply roll. This may be accomplished by running the web through a laser burn-off station 52 at which laser beams 53 may be utilized to burn off the deposited metal and form an extremely narrow demetalized zone 10, much narrower than is provided on commercially available webs. Consequently, material cost is reduced along with the size of the capacitor. The tension sensing and edge guide control systems employed in the present invention are available from Advanced Web Systems, Inc., 4793 Colt Rd., P.O. Box 6025, Rockford, Ill. 61125.

It is to be understood that, while the detailed drawings and specific examples given describe the preferred embodiments of the invention, they are for the purpose of illustration only, that the invention is not limited to the precise details and conditions disclosed and that various changes may be made therein without departing from the spirit of the invention which is defined by the following claims.

I claim:

1. A capacitive structure comprising a length of a plurality of layers, each said layer having opposed edges; each said layer comprising a dielectric substrate and a metallic film, said metallic film extending from a first one of said edges toward a second one of said edges, each of said layers including a zone free of metallic film, said zone being spaced from said second edge leaving a narrow marginal metal film band at said second edge which is spaced by said zone from the remainder of said metallic film, said layers being disposed with said metallic film of each layer being separated by dielectric material from said metallic film of the adjacent layer, said layers being offset such that at a first side of the capacitive structure said first edges of a first group of layers lie outwardly beyond said second edges of a second group of layers, and at a second side of the capacitive structure said first edges of said second group of layers lie outwardly beyond said second edges of said first group of layers, said layers of said first group alternating with said layers of said second group, and the outwardly lying edges of said layers of each group being coated with electrically conductive material to electrically connect said metallic film of each layer of each respective group.

2. A capacitive structure as recited in claim 1, wherein said capacitive structure further comprises electrical connection means bonded to said electrically conductive material to facilitate electrical connection of said capacitive structure in electrical circuitry.

3. A capacitive structure as recited in claim 2 wherein said capacitive structure further comprises protective enveloping means applied to encapsulate said capacitive structure in a manner providing electrical insulation and moisture resistance for said capacitive structure while permitting electrical connection to said electrical connection means.

4. A capacitor comprising a plurality of layers, each of said layers comprising a dielectric substrate and a metallic film upon said substrate, said metallic film covering substantially all of a first side of said substrate of each of said layers, said metallic film being interrupted by a metal-free zone, said metal-free zone extending substantially parallel to a first of two opposing edges of said substrate and spaced therefrom thereby defining two metallized regions upon said substrate extending respectively from said first edge and a second edge of said substrate to said metal-free zone; said layers being disposed in two groups, layers of a first group of said two groups alternating with layers of a second group of said two groups, said metallic film of each layer lying adjacent the substrate of an adjacent layer, said two groups of layers being offset so that said first edges of said first group of layers extends beyond said second edges of said second group of layers and said first edges of said second group of layers extend beyond said second edges of said first group of layers, said extending first edges of said first and second groups of layers being respectively coated with electrically conducting material to electrically connect said metallized regions adjacent said first edges of each group.

5. A capacitor as claimed in claim 4 wherein said capacitor further comprises electrical connection means bonded to said electrically conductive material to facilitate electrical connection of said capacitor in electrical circuitry.

6. A capacitor as claimed in claim 5 wherein said capacitor further comprises protective enveloping means applied to encapsulate said capacitor in a manner providing electrical insulation and moisture resistance for said capacitor while permitting electrical connection to said electrical connection means.

7. A capacitive structure comprising a length of a plurality of generally planar layers extending from a first end to a second end, each said layer having a width extending from a first edge to a second edge; each said layer comprising a dielectric film substrate and a metallic pattern applied to said substrate, said metallic pattern comprising a first metallic region extending from said first edge toward said second edge to a first boundary substantially parallel to said second edge and a second metallic region extending from said second edge toward said first edge to a second boundary substantially parallel to said second edge; said first metallic region and said second metallic region extending from said first end to said second end, said first boundary being further displaced from said second edge than said second boundary thereby defining a metal-free zone intermediate said first boundary and said second boundary; said layers being disposed with said metallic pattern of each layer being separated by dielectric film substrate from said metallic pattern of an adjacent layer, said layers being offset such that at a first side of the capacitive structure said first edges of a first group of layers lie outwardly beyond said second edges of a second group of layers, and at a second side of the capacitive structure said first edges of said second group of layers lie outwardly beyond said second edges of said first group of layers, said layers of said first group alternating with said layers of said second group; said first group of layers thereby presenting said metallic region at said first side of the capacitive structure and presenting said second metallic region at said second side of the capacitive structure, and said second group of layers thereby presenting said second metallic region at said first side of the capacitive structure and presenting said first metallic region at said second side of the capacitive structure; whereby, at each side of the capacitive structure, said first, outwardly lying, edges may be electrically connected in common by electrically conductive material and said second metallic regions electrically insulate said second edges from said first edges and structurally support the capacitive structure at said second edges.

8. A capacitive structure as recited in claim 7 wherein said capacitive structure further comprises electrical connection means bonded to said electrically conductive material to facilitate electrical connection of said capacitive structure in electrical circuitry.

9. A capacitive structure as recited in claim 8 wherein said capacitive structure further comprises protective enveloping means applied to encapsulate said capacitive structure in a manner providing electrical insulation and moisture resistance for said capacitive structure while permitting electrical connection to said electrical connection means.

10. A capacitive structure as recited in claim 7 wherein said length is much greater than said width whereby said capacitive structure is a stick of indiscriminate capacitance suitable for severing into segments of discrete capacitance.

11. A capacitive structure as recited in claim 7 wherein said length is appropriate whereby said capacitive structure is a chip of discrete capacitance.

* * * * *